United States Patent [19]

Hayama

[11] 4,133,298
[45] Jan. 9, 1979

[54] SOLAR HEAT COLLECTING APPARATUS
[75] Inventor: Hajime Hayama, Nara, Japan
[73] Assignee: Sanyo Electric Co., Ltd., Moriguchi, Japan
[21] Appl. No.: 723,789
[22] Filed: Sep. 16, 1976
[30] Foreign Application Priority Data Sep. 26, 1975 [JP] Japan .................. 50-117967
Nov. 28, 1975 [JP] Japan .................. 50-144445

[51] Int. Cl.² .............................................. F24J 3/02
[52] U.S. Cl. .................................... 126/271; 165/181
[58] Field of Search ............... 126/270, 271; 237/1 A; 60/641; 165/181

[56] References Cited

U.S. PATENT DOCUMENTS

| | | | |
|---|---|---|---|
| 980,505 | 1/1911 | Emmet | 126/271 |
| 1,946,184 | 2/1934 | Abbot | 126/271 |
| 2,133,649 | 10/1938 | Abbot | 126/271 |
| 2,554,661 | 5/1951 | Clancy | 165/181 |
| 3,227,153 | 1/1966 | Godel et al. | 126/271 |
| 3,464,402 | 9/1969 | Collura | 126/271 |
| 3,961,619 | 6/1976 | Estes et al. | 126/271 |
| 3,976,508 | 8/1976 | Mlavsky | 126/271 |
| 4,018,215 | 4/1977 | Pei | 126/271 |

FOREIGN PATENT DOCUMENTS 1108431 10/1959 France .................. 126/270

*Primary Examiner*—Kenneth W. Sprague
*Assistant Examiner*—James C. Yeung
*Attorney, Agent, or Firm*—Darby & Darby

[57] ABSTRACT

A solar heat collecting apparatus comprises at least one heat collecting element comprising a cylindrical outer member in which at least its circumferential wall has permeability to solar radiant energy and the two end faces of the cylinder are closed, a cylindrical inner member disposed in the outer member with the interposition of a thermal insulating space with its either end protruding beyond each end face of the outer member, an absorbing means for absorbing the difference between the amounts of heat expansion and contraction of the outer and inner members, the two members and the means being integrally formed.

6 Claims, 36 Drawing Figures

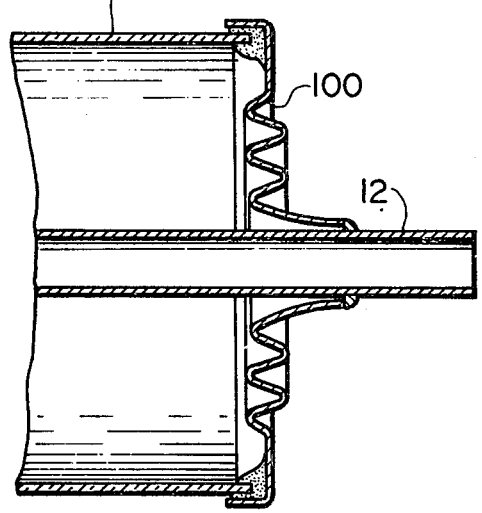
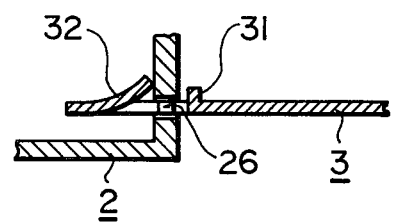
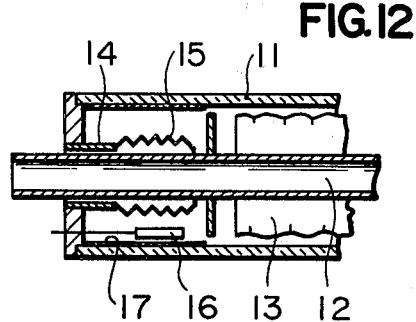
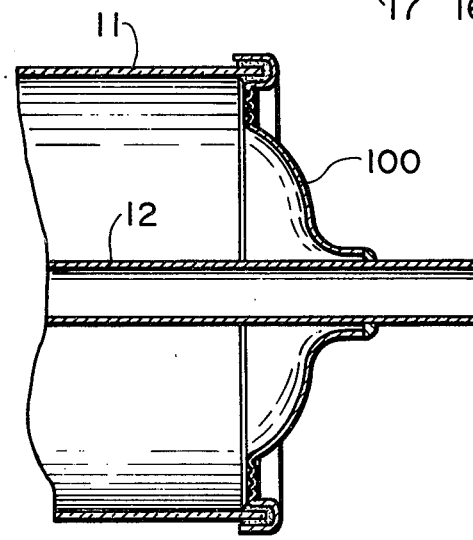
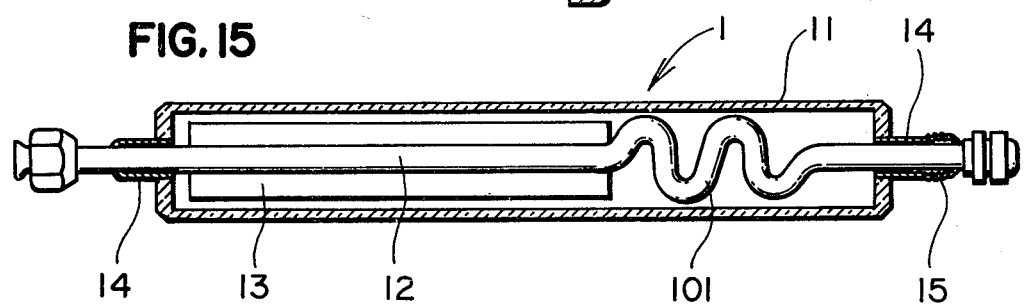

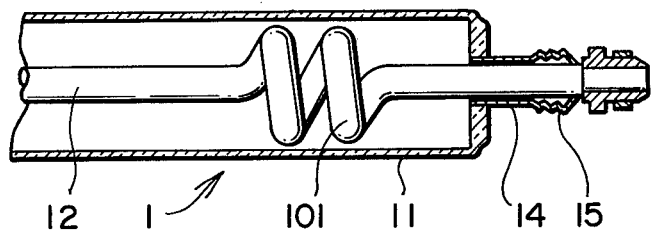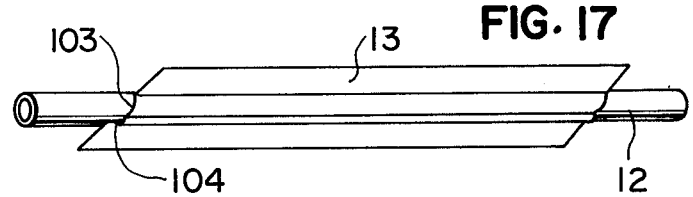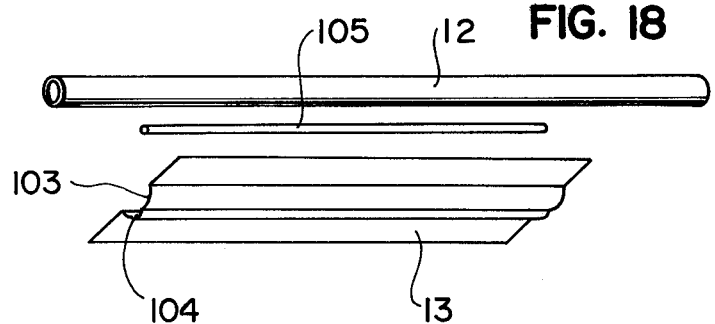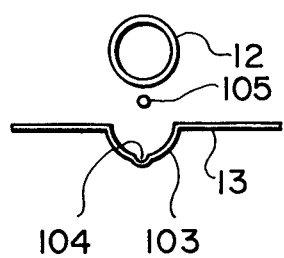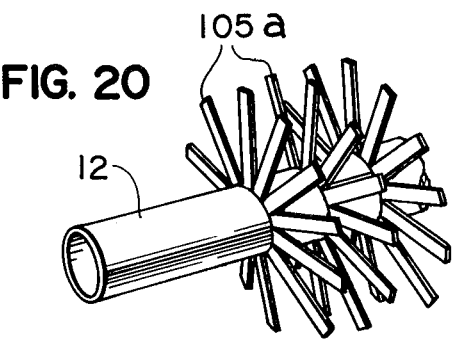

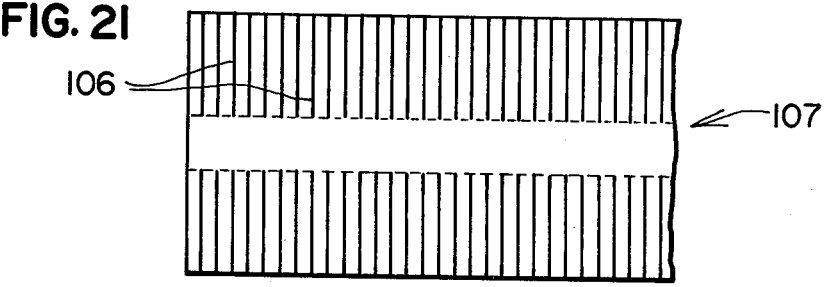
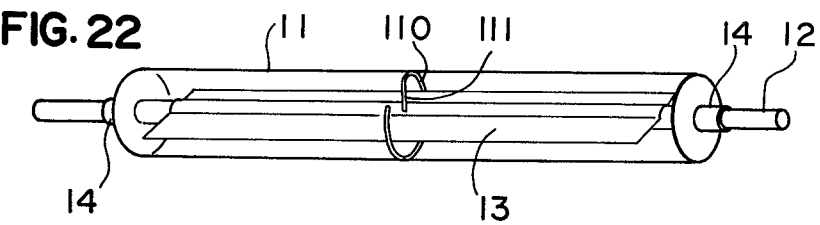
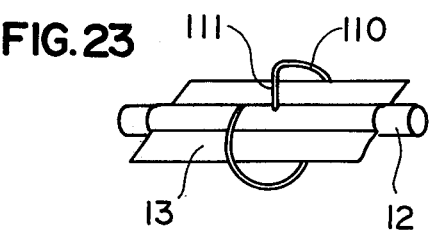
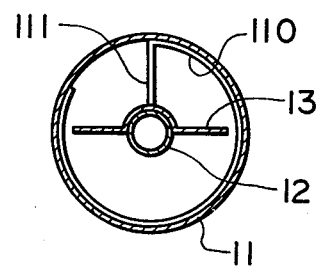
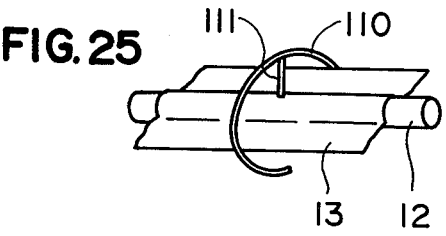
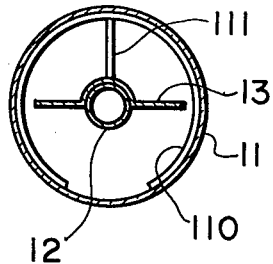

SOLAR HEAT COLLECTING APPARATUS

The present invention relates to an apparatus for converting energy of electromagnetic waves, especially solar radiant energy which is energy of electromagnetic waves of short wavelength into heat energy.

As well known, the density of solar radiant energy is less than as 1 KW/m$^2$ on the land surface perpendicular to the axis of the radiation. Consequently, for collecting high energy from solar radiant energy, an extremely large collecting area is required. On the other hand, solar radiant energy is widely distributed. In this respect, it is more desirable to collect such energy individually by making use of e.g. a roof, wall or the like of houses, than by means of an apparatus of a large scale. Further, solar radiant energy is substantially inexhaustibly supplied. Therefore, if such energy can be efficiently converted directly into heat energy, it provides non-pollutant permanent energy. In conclusion, it is most important to provide a high-efficiency heat collecting apparatus suitable for making use of solar radiant energy at an economical cost. However, any sufficiently effective apparatus has not been proposed yet which can convert solar radiant energy into heat energy at high efficiency and can be obtained economically.

Therefore, an object of the present invention is to provide a solar heat collecting apparatus of high efficiency, low heat loss and low cost.

Another object of the present invention is to provide a solar heat collecting apparatus which is light weight and easily adaptable to various kinds of buildings and capable of being mounted on a horizontal surface, which has been impossible in the conventional apparatus.

A further object of the present invention is to provide a solar heat collecting apparatus which is excellent in mass productivity, reliability, durability and the like as well as easy to be preserved and inspected.

A further object of the present invention is to provide a solar heat collecting apparatus comprising at least one solar heat collecting element comprising a cylindrical outer member in which at least the circumferential wall of the cylinder is permeable to solar radiant energy and the two ends faces of the cylinder are closed, a cylindrical inner member disposed in the outer member with the interposition of a thermal insulating space with its either end protruding beyond each end face of the outer member, an absorbing means for absorbing the difference between the amounts of heat expansion and contraction of the outer and inner members, the two members and the means being integrally formed.

Solar radiant enegy exhibits the greatest value at the wavelengths near 0.5 $\mu$m, as well known. One of materials which have permeability to solar radiant energy near this region is, for example, glass material. By forming the outer member from glass material, an extremely well air-tight space can be obtained. Further, glass material has high workability, and can provide a vacuum inside the outer member to easily form a highly thermal insulating space. The whole of the outer member may be formed from such glass material, but alternatively both of the end faces are formed from other material e.g. metal material. Thus, inside of the outer surface defined by the circumferential wall and the closed end faces is forming a thermal insulating space. For obtaining further excellent thermal insulating property, the space is made vacuous as abovementioned. In this vacuous thermal insulating space, the transmission of heat energy due to convection is reduced to the minimum, resulting in the reduction of escape of heat energy collected by the inner member. Further, inert gas may be injected into the thermal insulating space. In this case, glass material for the outer member may be substituted by plastic material in practice. The inner member, which is disposed inside the outer member, serves as a member absorbing solar radiant energy. The inner member is formed from metal material of high heat conductivity e.g. copper, aluminum or the like, into a hollow cylindrical shape. In this hollowed section, heat transmitting medium e.g. water, air and the like is supplied. Further, the outer surface of the inner member is preferably made selective absorbent surface. Black chrome, Al-Ni, Al-Cr, Sn, In, black nickel etc. is used as material for such a selective absorbent surface and applied on the outer surface of the inner member. The inner member thus preferably provided with a selective absorbent surface serves as a absorbent member in the region of the wavelengths of solar radiant energy, but as a radiant member in the region of the wavelengths of thermal radiant energy from the inside of the inner member, so that the loss of heat energy due to the radiation from the inner member is extremely reduced.

The two end portions of the inner member are disposed so as to protrude beyond the end faces respectively of the outer member. The inner member is airtightly supported at the both ends of the outer member so as to form the abovementioned thermal insulating space. Since the inner and outer members are formed from different materials e.g. copper and glass as abovementioned, there is naturally difference between the coefficients of linear theremal expansion of the members. This difference between the coefficients causes the inner and outer members to expand at different degrees when supplied with e.g. solar radiant energy. For example, in case of the outer member formed from soda glass and the inner member from copper, the difference between the amounts of thermal expansion of the members due to the difference between the coefficients of linear thermal expansion is 1.7 mm/m. Therefore, with a standard heat collecting element of 2 m in whole length, the difference between the amounts of linear thermal expansion of the two members is about 3.4 mm. If the inner and outer members are fixedly supported at both of their ends, the difference between the amounts of thermal expansion causes either of the members to be mechanically deformed and finally damaged. Therefore, in order to eliminate this defect, a means is provided for absorbing the difference between the amounts of thermal expansion of the inner and outer members. The said absorbing means is a mechanical deformation absorbing body, and realized by forming the same from such a material or in such a shape as absorbing the difference between the amounts of the linear thermal expansion of the inner and outer members. Further, the absorbing means is provided on one end face of the outer member. And the outer and inner members are connected and integrated with each other through the absorbing means. Furthermore, the absorbing means may be mounted on a member extended from one end face of the outer member coaxially with the inner member, so that the inner and outer members are connected and integrated with each other through the absorbing means. On the other hand, at the other end, the inner and outer members may be integrally connected similarly through the absorbing means, but they may be directly attached to be integrated. The absorbing means can be realized by using flexible material, forming the same in the shape of a bellows or forming a metal sheet the same in a flexible shape.

In a heat collecting element thus comprising an inner member, an outer member and an absorbing means, further a heat collecting member is secured to the inner member in a heat conductive manner in order to collect more solar radiant energy. The said heat collecting member may be formed from the same material as the inner member, and further, preferably provided with a thin film having a selective absorbent property over the circumferential surface. The heat collecting member may be in the form of a flat plate or bladed member. The heat collecting member in the form of a flat plate is disposed along the length of the inner member, while the bladed member is mounted radially onto the circumferential surface of the inner member. The bladed heat collecting member is excellent in that it collects heat into the inner member due to its own heat conductivity and besides collects heat due to the heat guide function of the spaces defined by the bladed member. At at least one end of the inner member within the thermal insulating space, a bent portion functioning as an auxiliary absorbing means may be provided. The said auxiliary absorbing means is formed e.g. in zig-zag or spiral shape. Such an auxiliary absorbing means has in itself a function of absorbing the difference between the amounts of thermal expansion of the inner and outer members, similarly to the abovementioned absorbing means. Further, the auxiliary absorbing means used in combination with the absorbing means functions effectively when a plurality of heat collecting elements are arranged in series or in parallel. That is, when constructing a solar heat collecting apparatus in which a plurality of heat collecting elements are arranged in series or in parallel, the auxiliary absorbing means is used for correcting the lengths of the inner members and thus facilitating the connection between the inner members to one another. If the inner member has no such auxiliary absorbing means another member is required for correcting the length of the member. Further, the auxiliary absorbing means also absorbs the amount of thermal expansion of the inner member caused during the operation of the solar heat collecting apparatus.

The embodiments of the present invention will now be described with reference to the appended drawings. From the description, the present invention will become more apparent, to prove that many other advantages thereof than abovementioned are obtainable. In the drawing, similar numerals indicate similar members and the like, and the similar description is not repeated.

FIG. 11 is a sectional view showing the fitting of the reflecting plate shown in FIG. 1;

FIG. 12 is a sectional view of the main part of a modification of the heat collecting element;

FIG. 13 is a sectional view of the main part of another modification of the heat collecting element;

FIG. 14 is a sectional view of the main part of another modification of the heat collecting element;

FIG. 15 is a sectional view of the main part of the fourth modification of the heat collecting element;

FIG. 16 is a sectional view of the main part of the fifth modification of the heat collecting element;

FIG. 17 is a perspective view of a part of the heat collecting element;

FIG. 18 is an exploded perspective view of the part of the element of FIG. 17;

FIG. 19 is a sectional view of the part of the element of FIG. 18;

FIG. 20 is a perspective view of a modification of the heat collecting member;

FIG. 21 is a developed view of the heat collecting member of FIG. 20;

FIG. 22 is a perspective view of the heat collecting element fitted with a spacer;

FIG. 23 is a perspective view of the main part of the element of FIG. 22;

FIG. 24 is a sectional view of the element of FIG. 22;

FIG. 25 is a perspective view of the main part of a modification of the heat collecting element of FIG. 22;

FIG. 26 is a sectional view of the element of FIG. 25;

Figure 1:
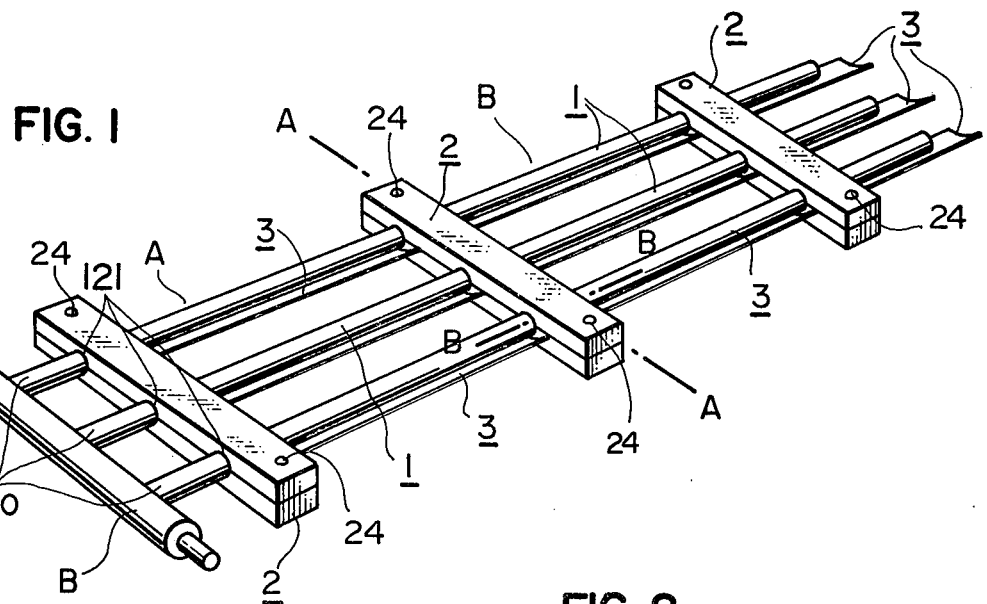
FIG. 1 is a perspective view of a solar heat collecting apparatus according to the present invention.
Figure 2:
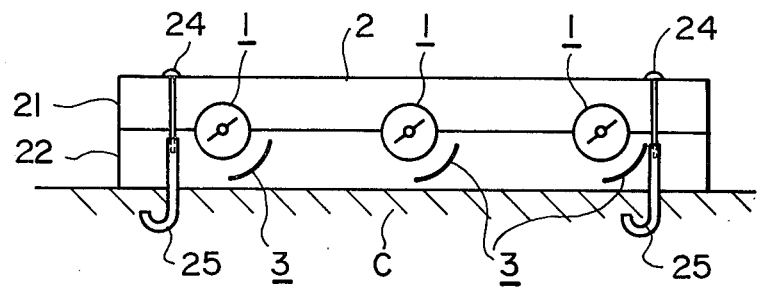
FIG. 2 is a schematic view of the apparatus of FIG. 1 sectioned along line A—A.
Figure 3:
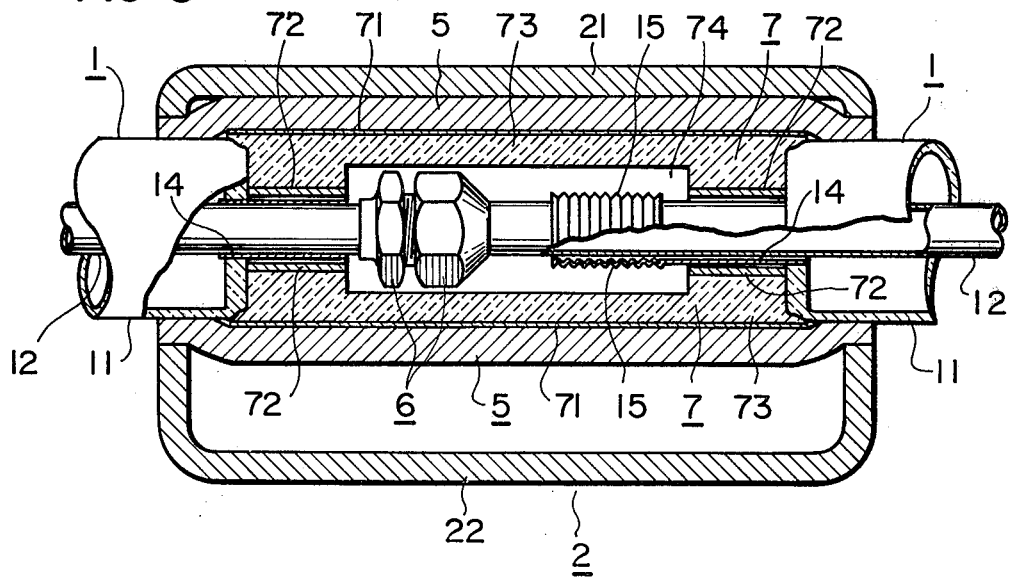
FIG. 3 is an enlarged sectional view of the apparatus of FIG. 1 taken along line B—B.
Figure 4:
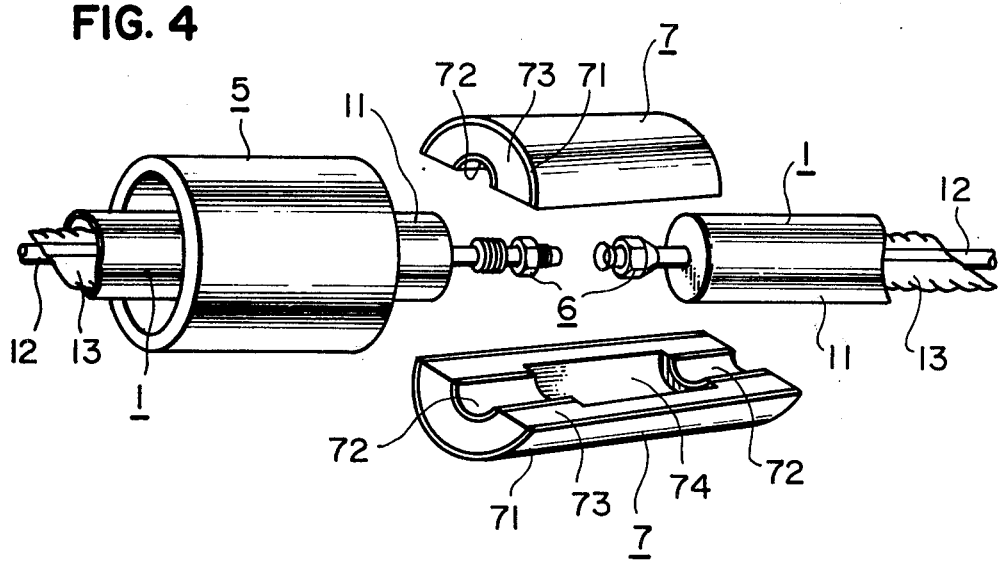
FIG. 4 is an exploded perspective view of FIG. 3.
Figure 5:
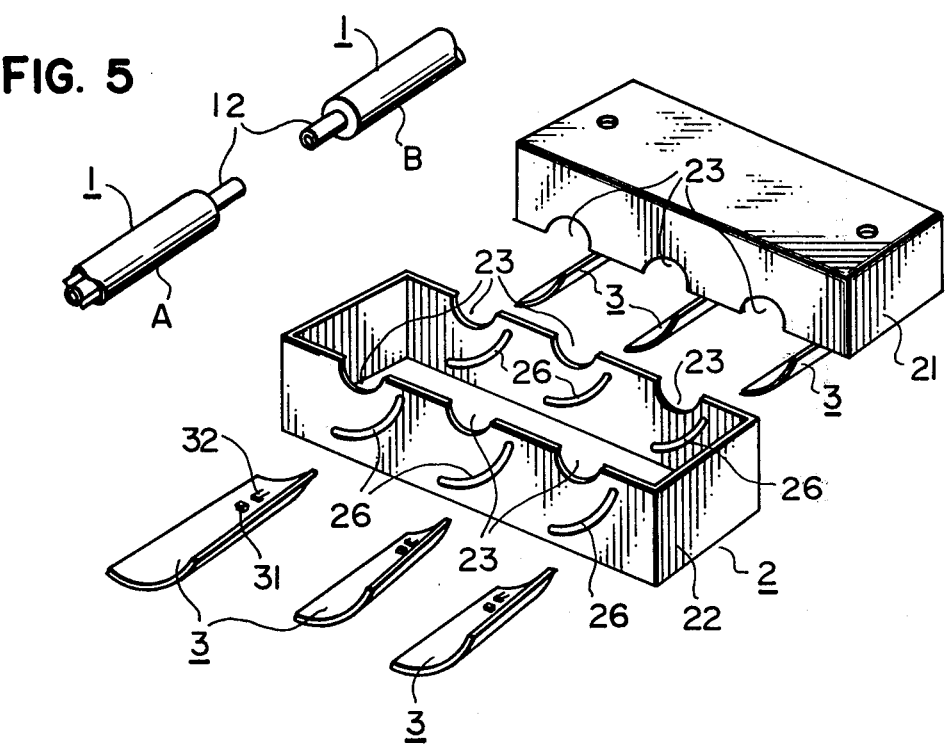
FIG. 5 is an exploded perspective view of a supporting member shown in FIG. 1.
Figure 8:
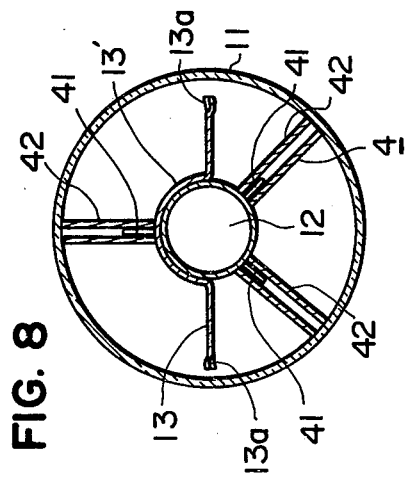
FIG. 8 is a sectional view of the element of FIG. 6 taken along line C—C.
Figure 10:
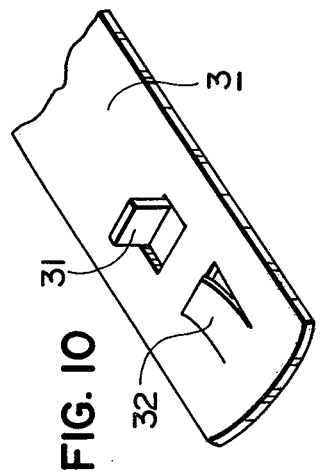
FIG. 10 is a perspective view of the main part of a reflecting plate shown in FIG. 1.
Figure 6:
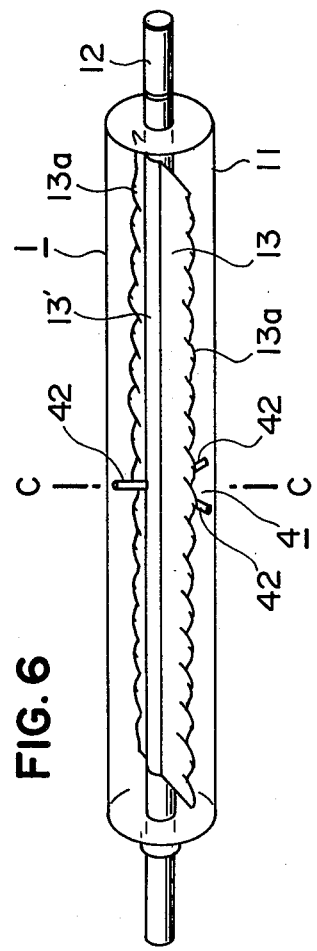
FIG. 6 is a perspective view of a heat collecting element shown in FIG. 1.
Figure 7:
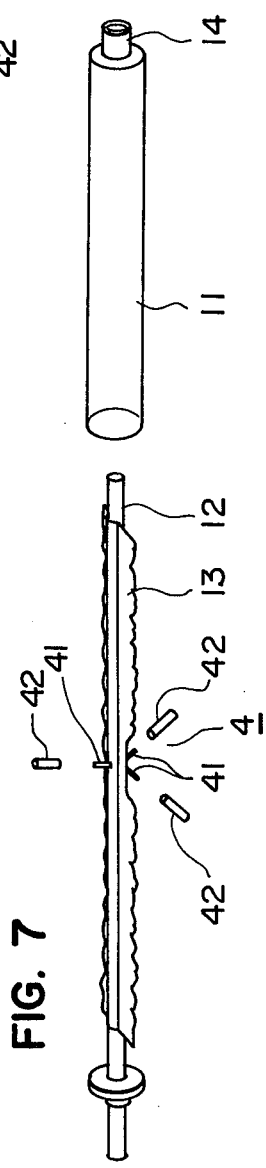
FIG. 7 is an exploded perspective view of the element of FIG. 6.
Figure 9:
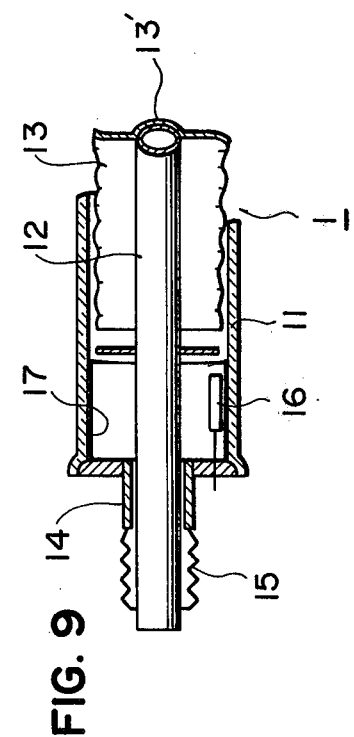
FIG. 9 is a sectional view of the main part of the element of FIG. 6.

In FIGS. 1–11, a solar heat collecting apparatus comprises a plurality of solar heat collecting elements 1 and supporting members 2 integrally connecting the heat collecting elements 1. The solar heat collecting element 1 comprises an outer cylinder 11, i.e. an outer member, formed from light-permeable material e.g. soda glass, a heat collecting pipe 12, i.e. inner member, formed from solar radiant energy absorbent material e.g. copper and coaxially disposed inside the outer cylinder 11, onto the heat collecting pipe 12, a copper heat collecting fin 13, i.e. heat collecting member, being heatconductively attached.

Onto each of end faces of the glass outer pipe 11 a guide pipe 14 formed from ferronickel of a heat expansion coefficient similar to that of soda glass is welded through which both ends of the heat collecting pipe 12 are protruded beyond the outer pipe 11. Further, an expandable member 15, i.e. absorbing means, formed from phosphorus bronze is attached with wax to the portion between one of protruding portions of the heat collecting pipe 12 and one of the ends of the guide pipe 14. With the provision of this expandable member 15, the heat expansion and contraction of the heat collecting pipe 12 is absorbed, to prevent the glass outer cylinder 11 from being broken. That is, the outer cylinder 11 and the heat pipe 12 formed from different materials have different coefficients of heat expansion respectively. Since the heat collecting pipe 12 especially formed from copper has a coefficient of heat expansion of $1.7 \times 10^{-5}$/deg., while the outer cylinder has that of $80-100 \times 10^{-7}$/deg., the heat collecting pipe, if attached directly to the outer cylinder 11, is broken down. But according to the present invention, the heat expansion and contraction is absorbed by the expandable member 15, and thus the outer cylinder can be protected. In FIG. 12, the expandable member 15 is disposed inside the outer cylinder 11. Thus the guide pipe 14 extends inwardly.

The absorbing means may be in such a form as shown in FIG. 13 or FIG. 14. That is, it may comprise, as shown in FIG. 13 or 14, a bellows-shaped cap 100 formed from metal material and provided at one end of the outer cylinder 11. One peripheral edge of the cap 100 is welded with powdered lead glass to the outer cylinder 11 while the other peripheral edge is secured with wax to the heat collecting pipe 12, thereby making air-tight the thermal insulating space inside the outer cylinder 11. The cap 100 in FIG. 13 is formed as a whole into a bellows shape, while the cap 100 in FIG. 14 partly has such a shape.

Further, the expandable member 15 and the cap 100 may be formed from flexible material, of course, and they are not limited to the abovementioned bellows shape but may be of any construction that can absorb the difference between the amounts of thermal expansion and contraction of the outer cylinder 11 and the heat collecting pipe 12. The inside of the outer cylinder 11 is made vacuous in order to prevent heat release of outside due to the convection of gas e.g. air, intrusion of moisture and the inner circumferential surface being dewed. For these reasons, by providing and operating getters 16 at the end portions of the inside of the outer cylinder 11, the inside is made more vacuous. For the getters 16, barium, chrome, aluminum or the like is used, and by operating the getters 16, a metal reflecting film 17 is applied on the inner surface of both of the end portions to be covered with the supporting member 2 of the outer cylinder 11. This metal reflecting film 17 serves for preventing heat release from the portions, at the end of the outer cylinder 11, of the heat collecting pipe 12. That is, since the heat collecting fin 13 attached to the heat collecting pipe 12 is so dimensioned as to be a little shorter in view of the error of the length of the heat collecting element 1 caused during manufacturing, the heat collecting fin 13 cannot be attached to the portions of the heat collecting pipe 12 corresponding to the end portions of the outer cylinder. By providing the metal reflecting film 17 on the inner surface of such portions of the outer cylinder 11, heat radiated from the heat collecting pipe 12 is reflected by the reflecting film and not released to the outside, which otherwise would be released. For the provision of the reflecting films, other means than the getters may be used which can positively provide the same. The heat collecting fin 13 is secured to the heat collecting pipe 12 by silver soldering the curved middle portion 13' of the fin 13 to the pipe 12. Both ends of the fin 13 extend due to heat during the silver soldering operation and left thermally deformed thereafter, so that the fin 13 is apt to contact the outer cylinder 11 to break the same, and the below-mentioned solar radiant energy from the reflecting plate 3 cannot be effectively received. Therefore, according to the present invention, the heat collecting fin 13 as a whole is adapted to be held in substantially flat condition by providing a waved or jagged thermal deformation absorbing part 13a at each end of the heat collecting fin 13.

Further, the heat collecting pipe 12 is as long as 1 to 2 m in length, and filled with heat medium e.g. water, to become weighty so that the middle portion thereof is curved downwardly to contact the outer pipe 11 and thus heat receiving efficiency is lowered. According to the present invention, to prevent this, a spacer 4 for supporting the heat collecting pipe 12 in the middle portion of the axis of the outer pipe 11. This spacer 4 is constructed by attaching three pins 41 to the heat collecting pipe 12 at an angle of 120° with respect to one another and then inserting into each of said pins 41 a thermal insulating pipe 42 of such a length as substantially reaching the inner surface of the outer cylinder 11.

A plurality of such heat collecting elements 1 are arranged in parallel to form a heat collecting element group A, and integrated by means of a supporting member 2 within which the group A is integrally connected to a header 8 or another heat collecting element group B.

The supporting member 2 comprises a hollow box-shaped member divided into an upper and lower halves. In the wall at the contacting portion between the upper and lower halves, recesses 23, 23 are provided for holding the outer cylinders 11. The head ends of the outer cylinders 11 of the heat collecting element group A are received by the recesses 23 in one side wall, while those of the other group B are received by the recesses 23 in the other side wall, thereby opposing the end faces of the outer cylinders 11, 11 and the heat collecting pipes 12, 12 of the groups A and B to each other. Then each of the outer cylinders 11, 11 of the groups A and B are covered with a nonrigid foamy thermal tube 5, inside which one pair of opposed heat collecting pipes 12, 12 are connected together by means of a pair of flare joints 6. Between the flare joints 6 and the thermal tube 5 is interposed a thermal insulating holder 7 divided into an upper and lower halves, thereby preventing heat releasing from the part of the supporting member 2. In the thermal insulating holder 7 rigid foamy urethan 73 is filled between the outer and inner layers 71 and 72, and the middle portion of the inner layer is removed away to form a flare joint container 74. Further, the inner layer 72 is kept in contact with the guide pipe 14 attached to the outer cylinder 11 of the heat collecting element 1. The upper and lower halves 21 and 22 of the supporting member 2 are integrated by fittings 24, so that the heat collecting elements can be clampedly fixed through the thermal tube 5 at the recesses by the upper and lower halves 21 and 22 to be integrated into a heat collecting element group and at the same time connected with the adjacent group of the heat collecting elements, with sealing the inside of the supporting member 2.

The header 8 is connected and secured to the ends of the heat collecting elements 1 by means of the supporting member 2 and the flare joints 6 in the similar manner to that abovementioned and connected to a water or hot water pipe. The lower half 22 of the supporting member 2 is preliminarily fixed by means of an anchor bolt 25 onto a horizontal base C. The upper half 21 is fitted to the lower half 22 by threading the fitting 24 into the upper end of the anchor bolt 25.

Further, near each recess 23 in the lower half 22, there is provided a slit 26 curved and inclined at a certain angle with respect to the horizontal base surface C. Into each slit 26 is inserted a curved reflecting plate 3 formed from stainless steel or the like. At each end of the reflecting plate, there are provided a stopper 31 and a tongue 32 a little spaced from the stopper 31 and raised from the reflecting plate. The tongue 32 is inserted into the slit 26 of the supporting member 2 thereby preventing the reflecting plate 3 from being disengaged.

The heat collecting pipe 12, the heat collecting fin 13 and the reflecting plate 3 are so spaced that solar radiant energy is received by the reflecting plate 3 and the reflecting energy is received surely by the heat collecting pipe 12 and the heat collecting fin 13. Namely, the heat collecting pipe 12 and the fin 13 are positioned at the focal points of the reflecting plate 3. If the radius of curvature of the reflecting plate 3 is R, the focal distance is R/2, and consequently, the heat collecting fin 13 is positioned at a distance of R/2 from the reflecting plate 3 and in parallel with the plate 3 i.e. at a certain angle with respect to the horizontal surface.

According to the present invention, a reflecting plate is provided for each heat collecting element, thereby facilitating the preservation and inspection of the apparatus. That is, at the time of trouble, only heat collecting elements or reflecting plates out of order can be exchanged.

In the conventional apparatus, a plurality of heat collecting elements are contained in an outer casing and if required, a flat reflecting plate is also contained thereon. Then, whole body of such an apparatus is set to be inclined so as to face the sun. For this purpose, supporting legs are required for obtaining such inclination on an inclined roof or a horizontal base surface, resulting in making troublesome the preservation and inspection of the conventional apparatus.

As abovementioned, in an apparatus according to the present invention, the heat collecting pipe is disposed axially of the outer cylinder with both ends of the pipe protruded beyond the end faces respectively of the outer cylinder, at least either one of the outer cylinder and the heat collecting pipe is connected through an expandable member to another outer cylinder and the collecting pipe. As the result, the possible heat expansion and contraction of the heat collecting pipe can be absorbed by the expandable member, thus advantageously affording to protect the outer cylinder from breaking down, and to retain the vacuum degree in the outer cylinder.

In FIGS. 15 and 16, there is shown a modification of the heat collecting element 1, in which the heat collecting pipe 12 i.e. inner member is provided with a curved portion 101 serving as the auxiliary absorbing means. The curved portion 101 is obtained by thermally softening the heat collecting pipe 12 itself and forming into a zig-zag or helical shape.

If the heat collecting elements in the solar heat collecting apparatus are partly damaged or disordered, only the subject heat collecting elements have to be exchanged. However, it is extremely difficult to identically dimension a plurality of heat collecting elements, since more or less error in dimension is caused. Therefore, it is important how to absorb such error in dimension during the assembling or exchanging operation. According to the present invention, the dimensional error is absorbed by providing a curved portion 101 to the heat collecting pipe per se, thus facilitating the assembling and exchanging operations. That is, when the whole length of the pipe is greater, by pushing the heat collecting pipe 12 inwardly, the expandable member 15 contracts and the pushed amount is absorbed by the curved portion 101, to correct the whole length of the pipe 12. On the other hand, when the pipe 12 is shorter, by pulling outwardly the expandable member 15 and the curved portion 101 extend, thus correcting the length of the pipe as predetermined to permit the connection by means of the joints 6. Further, since a part of the heat collecting pipe per se is formed in zig-zag or helical shape as abovementioned, positions to be silver soldered are decreased in number, to increase the reliability of the water-tightness of the thermal insulating space, and to lower the cost. Furthermore, since the heat collecting pipe per se is curved, the curved portion is prevented from corroding earlier than other portions. Thus, a heat collecting apparatus of a stable quality can be obtained.

This auxiliary absorbing means may comprise a part of the heat collecting pipe formed into other shape than zig-zag or helical one, e.g. a bellows shape.

The heat collecting pipe 12 and the heat collecting fin 13 of the heat collecting element 1 are heat-conductively connected preferably in the manner as follows.

In FIGS. 17 and 19, the heat collecting fin 13 has a groove 103 of semi circular section for receiving the heat collecting pipe 12 thereinto, U or V shaped small groove 104 provided along the groove 103 substantially in the middle portion of the groove 103. Rod-shaped wax material 105 is mounted on the small groove 104, which is used for weldedly connected the heat collecting pipe 12 and the heat collecting fin 13.

The pipe 12 is fitted through the wax material 105 into the groove 103. When the whole thereof is heated in a furnace, the wax material melts and flows into the small groove 104 and into the clearance between the groove 103 and the pipe 12 to secure the pipe 12 into the groove 103.

Thus the heat collecting pipe 12 and the fin 13 are thermally connected, which dispenses with the troublesome operation of welding the wax material by heating the same with a burner, or of particulating the wax material and applying the same, to improve workability. Further, since the small groove is provided in the groove, and the wax material is disposed into the small groove, the positioning of the wax material is achieved by this small groove, and without uneven distribution of the wax material, the pipe 12 is uniformly welded.

Uneven distribution of the wax material is hardened into masses, which causes a space to be formed between the pipe 12 and the groove 103 or the pipe 12 to be raised up, resulting in the failure in obtaining sufficient thermal connection between the pipe 12 and the fin 13. According to the present invention, however, the said positioning of the wax material by the small groove prevents such uneven distribution of the same. Further since the wax material does not melt all at a time, but normally melts partially, the wax material firstly melted flows along the small groove to other parts, which prevents the was material to be partially hardened into masses. In FIGS. 20 and 21, there is shown a modification of a heat collecting member to be applied to the inner member.

Referring to FIGS. 20 and 21, the heat collecting member preferably comprises a copper plate 107 provided with slits 106. The copper plate 107 of the such shape is helically constructed and mounted on the heat collecting pipe 12, and the ends of the heat collecting pipe 12, and the plate 107 are heat conductively secured to each other. The plate 107 thus secured is formed into a heat collecting member having blades 105a. The heat collecting member having the blades 105a is advantageous as above and further in that the incident angle of solar radiant energy is not to be paid attention thereto, and that a highly free heat collecting element can be obtained.

In FIGS. 22 to 26, there is shown a modification of a spacer to be applied to the abovementioned heat collecting element.

Referring to FIGS. 22 to 26, this spacer 110 comprises a wire material having a C-shape and spring property. One end of the wire material is further bent to form a leg 111. By fixing the leg 111 directly or through a heat collecting fin 13 to the heat collecting pipe, whereby a plurality of spacers 5 is fitted to the heat collecting pipe 12. The C-shaped spacer is adapted to have a diameter larger than the inner diameter of the outer cylinder 11 and to effect outward spring force. By inserting the spacer into the outer cylinder 11 with its diameter reduced, it is in close contact with the inner circumferential surface of the outer cylinder 12, which, in cooperation with the spring effect, keep the heat collecting pipe 12 in a suspended condition, thereby preventing the pipe 12 to be lowered down. Besides, since the spacer 6 is in contact with the most part of the inner circumferential surface, the load of the heat collecting pipe is not applied in one or a few points but distributed through the whole thereof, resulting in the protection of the pipe 12 from damage. Further, since wire material which has a small heat releasing area, it has many advantageous effects e.g. that heat releasing therefrom is reduced. Further in FIGS. 25 and 26, there is shown another modification in which the leg 111 is attached to the middle portion of the C-shaped spacer 110.

Figure 28:
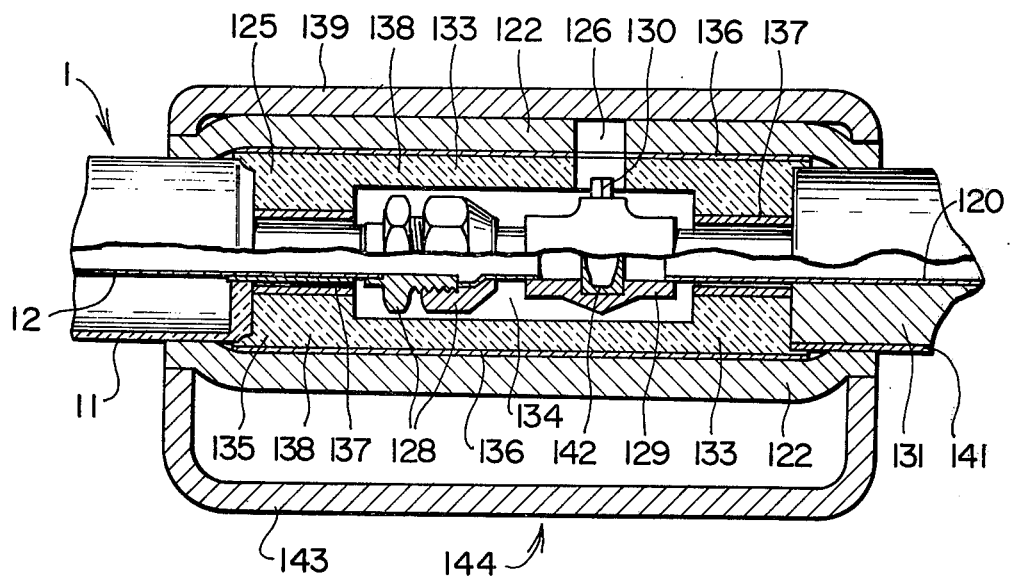
FIG. 28 is a sectional view of the supporting member of FIG. 27.
Figure 27:
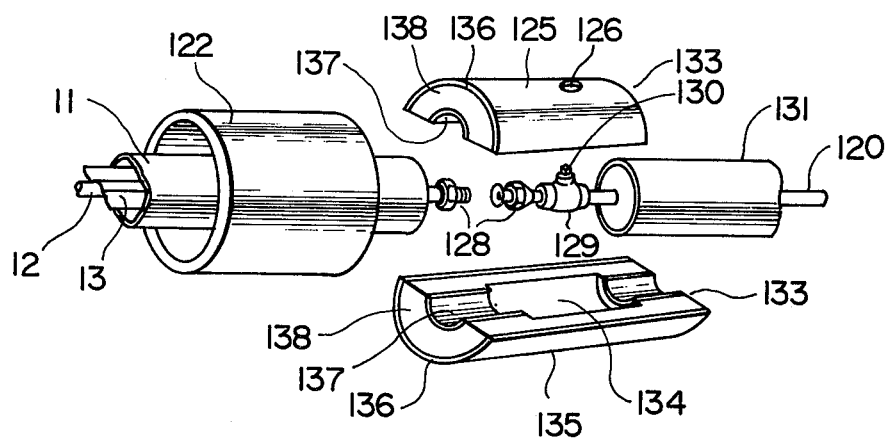
FIG. 27 is an exploded perspective view of a modification of the supporting member of FIG. 1.
Figure 29:
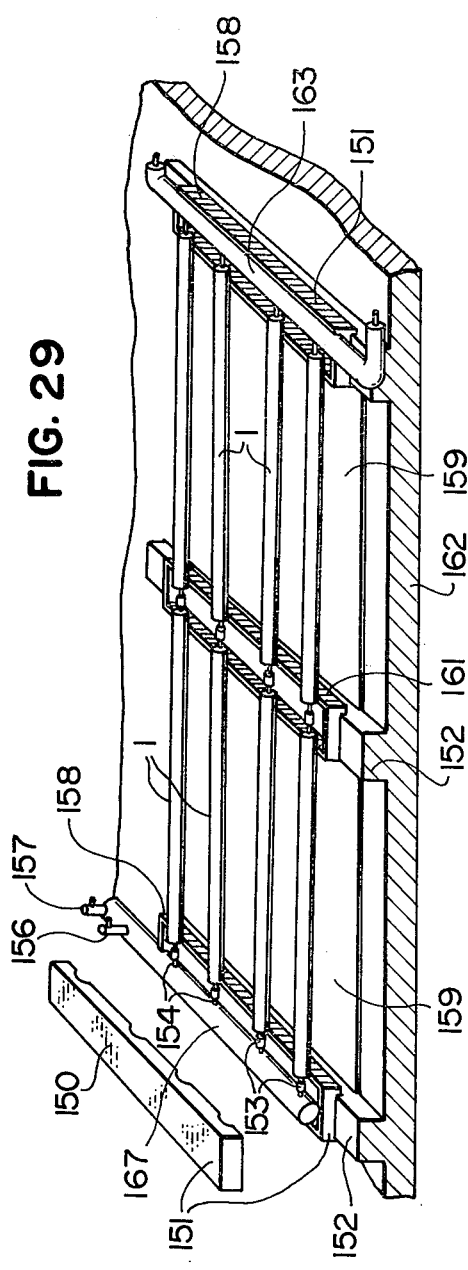
FIG. 29 is a perspective view of a modification of a solar heat collecting apparatus according to the present invention.
Figure 30:
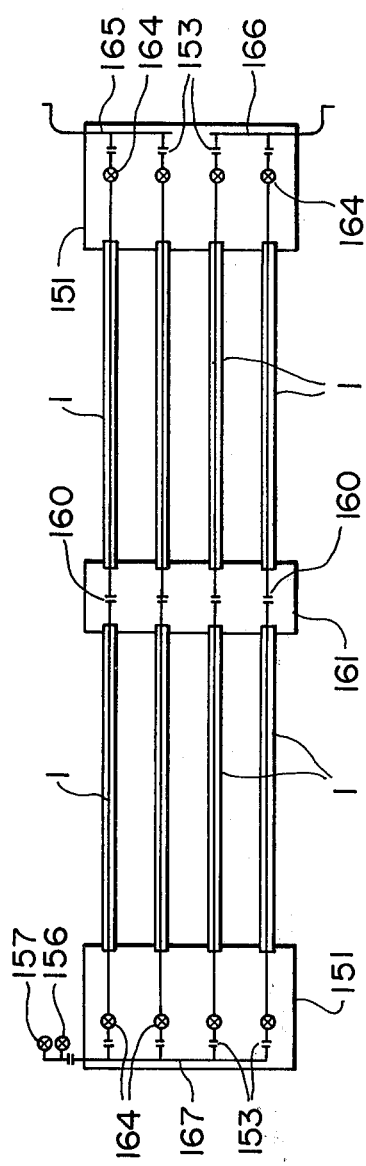
FIG. 30 is a plan view showing the pipe arrangement in the apparatus of FIG. 29.
Figure 31:
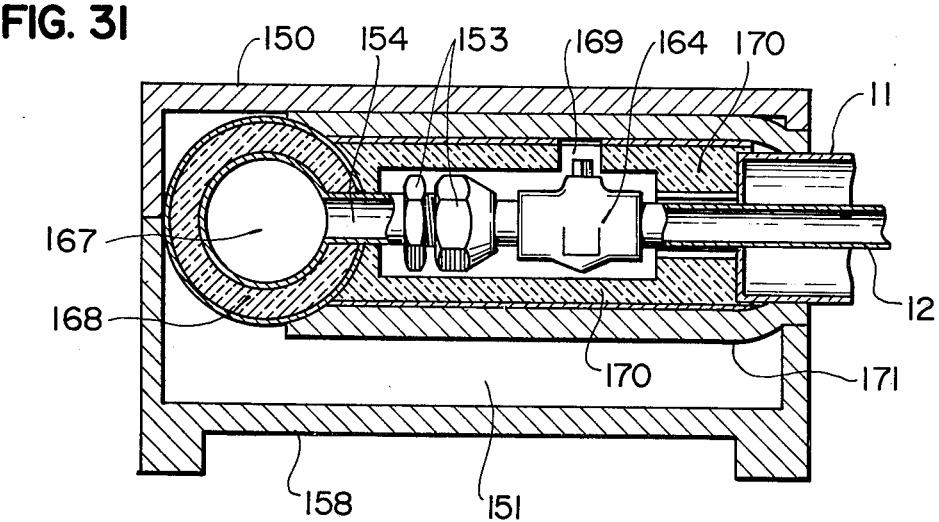
FIG. 31 is an enlarged sectional view of the connection in the arrangement of FIG. 29.
Figure 32:
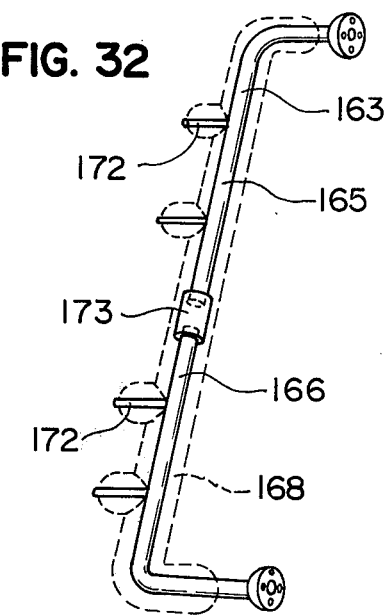
FIG. 32 is a perspective view of the right header in the arrangement of FIG. 29.
Figure 33:
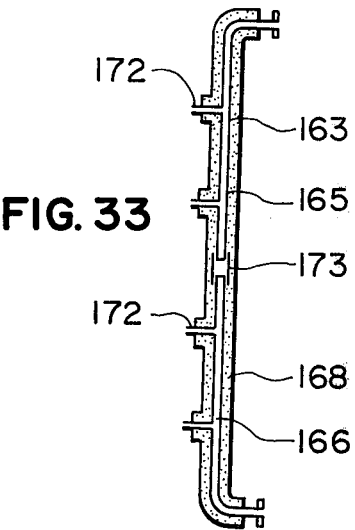
FIG. 33 is a sectional view of the header of FIG. 32.

Referring now to FIGS. 1, 27 and 28, description is given with regard to a modification of the supporting member 2 of the abovementioned solar heat collecting apparatus, especially a supporting member for effectively connecting and supporting the pipe 120, i.e. a feed or discharge member, and the heat collecting element 1.

The supporting member 144 adapted to integrally support the heat collecting elements 1 together and to cover the connecting portion between the heat collecting pipe 12 of each heat collecting element 1 and a feed or discharge pipe 120 comprises a light-resisting plastic body 143 and a lid member 139 adapted to cover the upper opening of the body 143. The outer cylinder 11 and a thermal insulating pipe of the feed or discharge pipe 120 are disposed in the recesses provided in the body 143 and the lid member 139, and then secured in a clamped manner by fixing the lid member 139 to the body 143 using screws 24. The thermal insulating pipe 131 comprises rigid foamy resin covering the outside of the feed or discharge pipe 120 and vinylchloride outer layer 141. A valve 129 is provided near a metal connecting member 128 e.g. a pair of flare joints for connecting the heat collecting pipe 12 and the feed or discharge pipe 120. The valve 129 is provided with a operating shaft 30 i.e. operating member of a hexagonal or any other non-circular shape extended from the closer 142 to protrude beyond the valve 129 body. By rotating the operating shaft 130, the closer is rotated to control, by opening and closing, the feed or discharge of heat medium to the heat collecting pipe 12. The valve 129 and the metal connecting member 128 are provided between each heat collecting element 1 and the feed or discharge pipe 120. And the valve 129 is opened or closed for increasing or decreasing the flow through certain heat collecting elements or at the time of preserving and inspecting the apparatus. The thermal insulating layer covering the metal connecting member 128 and the valve 129 comprises an upper and lower members 125 and 135 constituting a pair. Further, this thermal insulating layer 133 consists of plastic inner and outer layers 137 and 136. Furthermore, rigid foamy resin 138 is filled between the inner and outer layers 137 and 136 and the middle portion of the inner layer 137 is cut away to define a cavity 134 for containing the metal connecting member 128 and the valve 129. A protective tube 122 is positioned outside the thermal insulating layer 133, interposed between the supporting member 144 and the outer cylinder 11 formed from glass material and adapted to protect the glass outer cylinder 11 from being broken down at the time fastening the supporting member 144. The protective tube 122 is formed from non-rigid foamy urethane and serves also as a thermal insulating layer. An opening 126 in the thermal insulating layer 133 and the protective tube 122 is provided at a position just corresponding to the operating shaft 130, so that when the lid member 139 of the supporting member 144 is detached from the body 143, a jig can be inserted through the opening 126 and by means of this jig, the operating shaft 130 can be rotated to operate the closer 142.

In the supporting member of such a construction, the valve 129 is controlled i.e. opened or closed by detaching the lid member 139 of the supporting member 144 from the body 143, inserting the jig through the opening 126 and then rotatably operating the operating shaft 130 and thus the closer 142.

In the supporting member 144, the lid member 139 is not provided with an opening for operating the operating shaft 130 of the valve 129. However, by providing an opening at a position corresponding to the opening in the thermal insulating layer 133, and fitting a waterproof cap to this opening of the supporting member, the opening and closing of the valve is more facilitated.

As abovementioned, the metal connecting member and the valve are wholly contained through the thermal insulating layer in the supporting member, so that wasteful heat release from the connecting portion of the heat collecting pipe can be prevented. Besides, since the thermal insulating layer is provided with the opening at a position corresponding to the operating shaft of the valve closer, the operating shaft can be operated through this opening, achieving advantages of e.g. eliminating the labor of removing the thermal insulating layer every time of operating the valve and further decreasing the damage of the thermal insulating layer and retaining excellent thermal insulating effect for a long time due to no need of repeated operations attaching and detaching the thermal insulating layer, and other effects.

A modification of the solar heat collecting apparatus shown in FIG. 1, especially one in which piping to the heat collecting elements can be largely omitted and the assembling operation can be facilitated, will be now described with reference to FIGS. 29 to 33.

In a solar heat collecting apparatus in which a plurality of heat collecting elements 1, 1 are arranged in parallel with a space therebetween and suitably connected together, the serial connecting portions 160 are integrally supported by a supporting case 161 and connected by a metal connecting member within the serial connecting portions 160. A pair of right and left headers 163, 167 having branches 154, 172 to be connected to the heat connecting pipes 12 of the heat collecting elements respectively are covered on the outer surface with the thermal insulating material 168. One header 163 comprises two pipes 165, 166 with its one end closed. The two pipes with closed ends opposed to each other are secured by a connecting pipe 173 so that they seem like a single header in appearance but the flow passages are separated in practice. One pipe 166 of the header 163 serves as a feed passage and the other 165, as a return one. Therefore, operations feeding and discharging water to and from the solar heat collecting apparatus can be effected at the same side of the apparatus. Besides, since the pipes can be treated as a single header in appearance, the connecting portion between the header and the heat collecting pipe is easily supported.

A gas-liquid separating valve 156 and pressure safety valves 156, 157 serve for discharging bubbles from the pipings and the heat collecting pipes 12 and keeping constant pressure in the pipes by its actuation in response to an extraordinary pressure therein. A supporting member 151 supporting the connecting portion between the heat collecting elements and the branches 154, 172 together with the headers 163, 167 comprises a pair of upper and lower cases 150, 158, between which the heat collecting elements 1, 1 . . . and the headers 163, 167 are fixed in the clamped manner.

The heat collecting pipes 12 of the heat collecting elements 1, 1 . . . and the branches of the headers 163, 167 are connected together by means of a pair of flare joints 153, and each heat collecting pipe 12 is provided with a cock 164 which is also contained in the supporting member 151. The thermal insulating layer 170 covering the outside of the abovementioned connecting portion is provided with an opening 164 at a position corresponding to the shaft of the cock in order to permit the opening and closing of the cock 164. The protective tube 171 covering the outside of the thermal insulating layer 170 contributes to the protection of the glass cylinder 11 of each of the heat collecting elements 1, 1 . . . . The base surface 162 for settling the solar heat collecting apparatus thereon is constructed by providing a fitting surface in raised manner on which the supporting members 151 and the supporting cases are to be mounted, and providing a space between each of the heat collecting elements 1, 1 . . . and the base in which space a reflecting plate 159 is to be disposed.

As abovementioned, in this modification, the connecting portions between the heat collecting elements and the headers are integrally connected to one another together with the headers. Therefore, the connecting portions, the headers and the heat collecting elements are supportedly secured at the same time, thus improving the efficiency of the assembling operation. Further, since the passage of one header is divided on the way into a feed and return passages, heat medium can be flowed into and out on the same side, advantageously in view of piping operation. If the feed and discharge passages are separated on the right and left sides respectively, return pipings are required and heat release from the return pipings are caused. However, in this modification, the passage of the header is divided, heat medium is flowed in and out from the same side, and further the headers are contained in the supporting member, so that return pipings are not required, which is advantageous in that heat loss from the headers are eliminated, and others.

Figure 36:
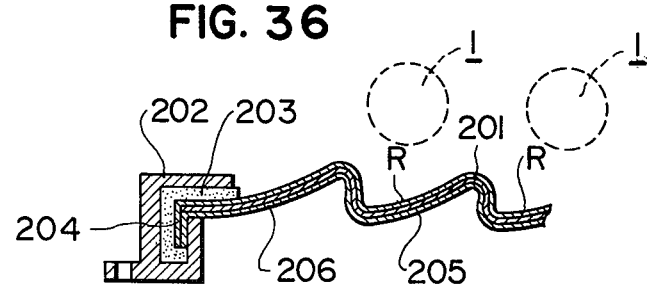
FIG. 36 is a sectional view of the main portion of the apparatus of FIG. 34.
Figure 34:
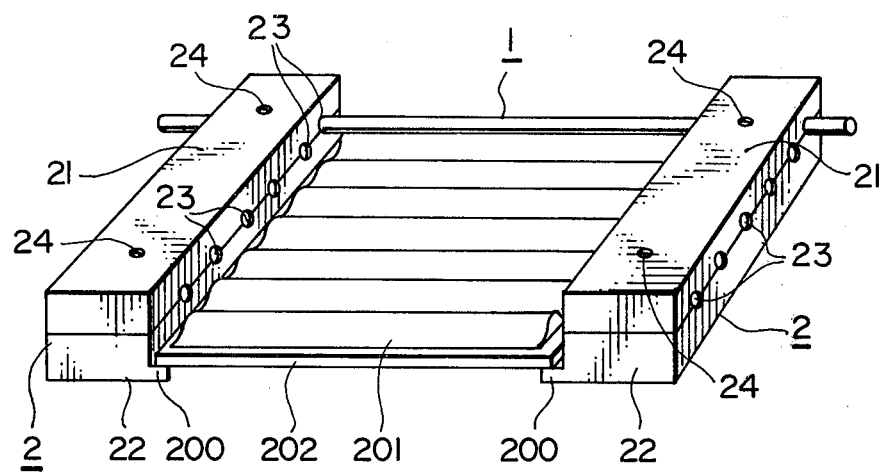
FIG. 34 is a perspective view of another modification of an apparatus according to the present invention.
Figure 35:
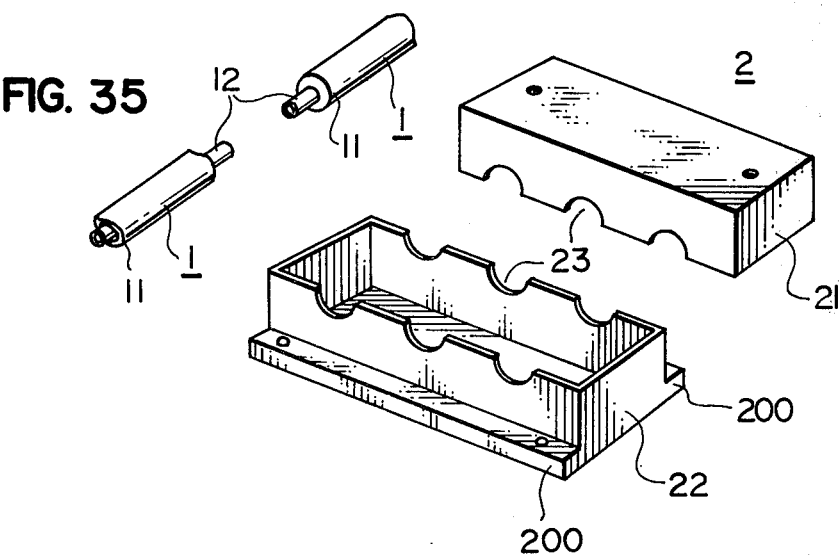
FIG. 35 is an exploded view of a part of the apparatus of FIG. 34.

Another modification of the solar heat collecting apparatus shown in FIG. 1, especially one in which reflecting plates each provided with a curved surface, one in correspondence with each heat collecting element, are fitted to the supporting members will be now described with reference to FIGS. 34 to 36.

The reflecting plates 201 mounted on a collar member 200 integral with the lower half 22 of the supporting member 2 and secured by means of a detachable screw is molded from light-permeable synthetic resin material e.g. acrylic resin so as to have a curved surface R per each heat collecting element 1, and coated on the back surface with a reflecting film by e.g. vacuum evaporating reflecting material e.g. aluminum, and further applying on the lower surface, polyurethan synthetic resin painting of an excellent weather-resisting property to provide a protective film 206.

The peripheral edge of the reflecting plate 201 is bent downwardly. The bent portion 204 is fitted through a rubber packing 203 with a sash 202. The reflecting plate is secured through said sash to the supporting member. The reflecting film 205 is not attached to the bent portion 204, and only the protective layer is formed on the inside of the bent portion 204. This prevents rain water from permeating between the back surface of the reflecting film 205 and also the reflecting film 205 from being detached.

In this modification, since a reflecting plate having a curved surface per each heat collecting element is secured to the supporting member, the assembling operation is more facilitated than the abovementioned construction in which one reflecting plate is fitted per one heat collecting element, and possible damaged reflecting plate can be easily removed away from the supporting member. Further, since a plurality of heat collecting elements are supported by a pair of supporting members, only damaged heat collecting elements can be exchanged from the supporting member, thus facilitating the preservation and the inspection of the apparatus, and achieving other advantages.

What is claimed is:
1. Solar heat collecting apparatus comprising:
a plurality of heat collecting elements, each of said elements including, a tubular outer member having a circumferential wall portion permeable to radiant solar energy, end portions sealed to said tubular outer member to provide an evacuated space within the outer member, a tubular inner member disposed within the evacuated space of the outer member and having an outer circumferential surface for absorbing solar radiant energy, said tubular inner member having end portions which protrude through respective end portions of the outer mem- ber, absorbing means for absorbing the difference between the amounts of heat expansion and contraction of said outer member and said inner member, and a bladed heat collecting member connected in heat conducting relation to, and extending radially from, the outer surface of the inner member within the evacuated space;

a plurality of means of thermally insulating material for supporting said plurality of heat collecting elements, the end portions of the inner members of the heat collecting elements being connected together inside the support elements;

means for conducting a fluid through the inner members of a plurality of said heat collecting elements connected in series; and a plurality of valve means for controlling the flow of fluid through a selected number of said inner members, each of said valve means being enclosed in said supporting means and disposed at the connection between the fluid conducting means and the end portion of the inner member of the last heat collecting element of a series of said elements, said supporting means having openings therein for allowing operation of said valve means.

2. Solar heat collecting apparatus comprising a heat collecting element which comprises:

a tubular outer member having a circumferential wall permeable to solar radiant energy and end portions for closing the respective two ends of the circumferential wall;

a tubular inner member for absorbing solar radiant energy, said inner member being disposed in the outer member with the interposition of a thermal insulating space therebetween;

each end portion of said tubular inner member protruding connectively with and outwardly through respective closed end portions of the outer member;

means for absorbing the difference between the amounts of expansion and contraction of the outer and inner members, said means connecting at least one of the closed end portions of the outer member with at least one of the end portions of the inner members; and means for facilitating the expansion and contraction of the inner member alone by curving said member, whereby the difference between the amounts of heat expansion and contraction of the outer and inner members is absorbed and the absorbing means cooperate with said expansion and contraction means to maintain the required length of the element.

3. A solar heat collecting apparatus as in claim 2 wherein said means for facilitating the expansion and contraction of the inner member alone is located in the inner space of the outer member.

4. Solar heat collecting apparatus as in claim 2 wherein at least one end portion of the inner member is interconnected within a supporting member with the end portion of the inner member of another heat collecting element to form a series-connected group of heat collecting elements; and a plurality of said groups of heat collecting elements mounted parallel to one another and integrally supported by said supporting member.

5. Solar heat collecting apparatus as in claim 4 further comprising:

means for conducting a fluid through the inner members of a plurality of said heat collecting elements connected in series; and a plurality of valve means for controlling the flow of fluid through a selected number of said inner members, each of said valve means being enclosed in said supporting means and located at the connection between the fluid conducting means and the end portion of the inner member of the last heat collecting element of a series of said elements, said supporting means having openings therein for allowing operation of said valve means.

6. A heat collecting element for a solar heat collecting apparatus comprising:

a tubular outer member having a circumferential wall portion which is permeable to radiant solar energy, and end portions sealed to said wall portion to provide an evacuated space within the outer member;

an inner member disposed within the evacuated space of the outer member and having an outer circumferential surface for absorbing radiant solar energy, and end portions which protrude through the end portions of the outer member; and a heat collecting member which has a first groove for insertion of the outer circumferential surface of the inner member, said first groove having therein a second groove, said second groove being smaller than said first groove, and said second groove being disposed along the middle portion of said first groove for inserting a rod comprised of a wax-like material, so that a thermal bond is formed between the collecting member and the inner element upon melting the wax-like material.

* * * * *